United States Patent
Canetti et al.

(10) Patent No.: US 8,108,683 B2
(45) Date of Patent: Jan. 31, 2012

(54) MITIGATING DICTIONARY ATTACKS ON PASSWORD-PROTECTED LOCAL STORAGE

(75) Inventors: Ran Canetti, Brookline, MA (US); Shai Halevi, Elmsford, NY (US); Michael Steiner, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1525 days.

(21) Appl. No.: 11/501,831

(22) Filed: Aug. 10, 2006

(65) Prior Publication Data

US 2008/0049939 A1 Feb. 28, 2008

(51) Int. Cl.
*G06F 21/00* (2006.01)

(52) U.S. Cl. .......................... 713/182; 713/183; 380/44

(58) Field of Classification Search ................ 726/2, 27, 726/28; 713/182, 183; 380/44–47
See application file for complete search history.

(56) References Cited

U.S. PATENT DOCUMENTS

| | | | |
|---|---|---|---|
| 5,276,314 A * | 1/1994 | Martino et al. | 340/5.27 |
| 6,317,834 B1 * | 11/2001 | Gennaro et al. | 713/186 |
| 7,219,368 B2 | 5/2007 | Juels et al. | |
| 7,653,931 B1 * | 1/2010 | Peterson et al. | 726/2 |
| 2002/0029341 A1 * | 3/2002 | Juels et al. | 713/184 |
| 2003/0191947 A1 | 10/2003 | Stubblefield et al. | |
| 2004/0059951 A1 * | 3/2004 | Pinkas et al. | 713/202 |
| 2006/0036868 A1 * | 2/2006 | Cicchitto | 713/182 |

OTHER PUBLICATIONS

Dodis, Y., et al., "Fuzzy Extractors: How to Generate Strong Keys from Biometrics and Other Noisy Data", EUROCRYPT 2004, LNCS 3027, 2004, pp. 523-540.

Dodis, Y., et al., "Fuzzy Extractors: How to Generate Strong Keys from Biometrics and Other Nosity Data", Cryptology ePrint Archive, Report 2003/235, Apr. 28, 2006.

Kaliski, B., "PKCS #5: Password-Based Cryptography Specification Version 2.0", The Internet Society, http://www.ietf.org/frc/frc2898.text, Sep. 2000.

Naor, M., "Verification of a human in the loop or Identification via the Turing Test", preliminary draft, Sep. 13, 2006.

Nisan, N., "Randomness is Linear in Space", Journal of Computer and System Sciences, vol. 52, No. 1, 1996, pp. 43-52.

Pinkas, B., et al. "Securing Passwords Against Dictionary Attacks", Proceedings of the 9th ACM Conference on Computer and Communications Security, ACM Press, Washington, DC, Nov. 2002, pp. 161-170.

Stubblefield, A., et al., "Inkblot Authentication", Technical Report MSR-TR-2004-85, Aug. 2004.

Von Ahn, L., et al., "CAPTCHA: Using Hard AI Problems for Security", in "Advances in Cryptology-EUROCRYPT '2003", vol. 2656 of Lecture Notes in Computer Science, Springer-Verlag, Berlin, Germany, 2003.

Luis Von Ahn et al., "Telling Humans and Computers Apart Automatically," Communications of the ACM, Feb. 2004, vol. 47, No. 2, pp. 57-60.

* cited by examiner

*Primary Examiner* — Edward Zee
(74) *Attorney, Agent, or Firm* — Cahn & Samuels, LLP

(57) ABSTRACT

The invention includes a method for key creation and recovery based on solutions to puzzles solvable by humans and not computers. In some exemplary embodiments, the key is created and recovered based on the solution(s) in conjunction with the password entered by the user. The puzzle(s) is selected based on the password used by the user from a puzzle database containing multiple puzzles that is greater in number to the number of puzzles used in conjunction with a particular password.

19 Claims, 3 Drawing Sheets

MITIGATING DICTIONARY ATTACKS ON PASSWORD-PROTECTED LOCAL STORAGE

I. FIELD OF THE INVENTION

This invention relates to computer systems, and, more particularly, to computer system authentication including secure derivation of cryptographic keys from human-memorizable passwords.

II. BACKGROUND OF THE INVENTION

A common situation in computer systems is where all the available local storage on a computer is physically readable by anyone and needs to be cryptographically protected, and further the only available source of secret randomness is a human memorizable password. Examples include a multi-user system where a browser lets users store personal information and site-specific passwords under the protection of one master password, or a laptop whose disk is searchable when captured and access to data is protected by a password. The common solution for this situation is to derive a cryptographic key from the user-supplied password possibly together with a public, locally stored salt. (A salt is a random value that is generated and retained for one specific context and is primarily used to keep different contexts separate. The reason a salt is used is to make the hash value different for different users even if they happen to choose the same password.) This practice, however, is quite problematic, since it allows an attacker to perform dictionary searches for the correct password. Indeed, if the attacker has access to the encrypted stored data and the password is taken from a relatively small dictionary, then this attack seems feasible. Furthermore, in contrast to the case of password-based key exchange between a client and a server where off-line dictionary attacks can be efficiently limited by the server, here the lack of any secret storage seems to make such attacks inevitable.

The threat of dictionary attack is commonly addressed by using a key-derivation-function such as SHA1 (first successor to SHA0 (a Secure Hash Algorithm created by the National Security Agency)) repeated a few thousand times to derive the key from the password, in the hope of slowing down off-line dictionary attacks. Although helpful, this approach is still not efficient as it entails an eternal cat-and-mouse chase where the number of iterations continuously increases to match the increasing computing powers of potential attackers.

III. SUMMARY OF THE INVENTION

This invention provides a method for generating an encryption key based on puzzles that are solvable by humans but not by computers, where the puzzles are selected based on a password received from a human user. The puzzle solutions can provide additional entropy for the encryption key that is greater than the entropy in a typical password selected by a user. An attack on the key cannot be completely automated, since it must employ a human to solve the puzzles.

According to at least one exemplary embodiment of the invention, the invention includes a method having the steps of receiving a password from a user; selecting at least one puzzle from a puzzle database based on the received password; for each selected puzzle providing the puzzle to the user, and receiving a solution for the puzzle from the user; and generating a key based at least on the entirety of at least one solution. According to a further exemplary embodiment of the invention, the method includes using the key for encryption and/or authentication of data. According to a further exemplary embodiment of the invention, the method includes using the key for decryption of data encrypted with the key and/or verifying the authentication. According to a further exemplary embodiment of the invention, creating a key is based on the entirety of at least one solution and the received password. According to a further exemplary embodiment of the invention, at least eight puzzles are selected from the puzzle database. According to a further exemplary embodiment of the invention, selecting at least one puzzle includes expanding the received password into a predetermined number of indices corresponding to particular puzzles within the puzzle database. According to a further exemplary embodiment of the invention, the method includes receiving information other than the password from the user, and selecting at least one puzzle is based on the received password and information provided by the user. According to a further exemplary embodiment of the invention, a salt is used in the selection of the at least one puzzle and/or generating the key. According to a further exemplary embodiment of the invention, the method includes generating puzzles for the puzzle database. According to a further exemplary embodiment of the invention, the method includes receiving information other than the password from the user, and generating puzzles is based on information received from the user. According to a further exemplary embodiment of the invention, generating the key includes using a fuzzy extractor.

According to at least one exemplary embodiment of the invention, the invention includes a method having the steps of receiving a password from a user; selecting at least four puzzles indexed with the password from a puzzle database having puzzles solvable by a human and not solvable by a non-human entity; for each selected puzzle providing the puzzle to the user, and receiving a solution for the puzzle from the user; generating a key based on at least the received solutions; and using the key to encrypt files.

According to at least one exemplary embodiment of the invention, the invention includes a computer program product comprising a computer useable medium including a computer readable program, wherein the computer readable program when executed on a computer causes the computer to: generate a key including receive a password from a user, compute indices based on the received password, select at least one puzzle from a puzzle database based on the computed indices, for each selected puzzle, query the user for a solution, compute a key based on the received at least one solution and the received password, and discard the solutions.

According to at least one exemplary embodiment of the invention, the invention includes a method having the steps receiving information including a password from a user; generating one or more puzzles based on at least some of the received information; for each generated puzzle providing the puzzle to the user, and receiving a solution for the puzzle from the user; and generating a key based at least on the entirety of at least one solution.

Given the following enabling description of the drawings, the apparatus should become evident to a person of ordinary skill in the art.

IV. BRIEF DESCRIPTION OF THE DRAWINGS

The present invention is described with reference to the accompanying drawings. In the drawings, like reference numbers indicate identical or functionally similar elements.

V. DETAILED DESCRIPTION OF THE DRAWINGS

The invention provides an approach for limiting off-line dictionary attacks in settings where the encryption (or cryptographic) key is derived from a user's password without relying on secret storage or secure hardware. The current invention suggests deriving the encryption key from various inputs including solutions to at least one puzzle that is presumed to be solvable only by humans such as a CAPTCHA (Completely Automated Public Turing Test to Tell Computers and Humans Apart) although other types of puzzles will satisfy this requirement as will be discussed in more detail below. The approach in at least one exemplary embodiment includes storing many different puzzles on a computer readable medium and using the user's password to specify which puzzle(s) needs to be solved. The encryption key is derived from the solution(s) to the puzzle(s), and potentially also from the user's password. When the user accesses the computer or the encrypted files, the user will be prompted to solve the selected puzzle(s) to create the required encryption key. The invention in at least one exemplary embodiment includes: puzzle-generation, which occurs during initial setup for the user, and key-derivation, which occurs during use such as upon login or accessing encrypted files.

Figure 1:
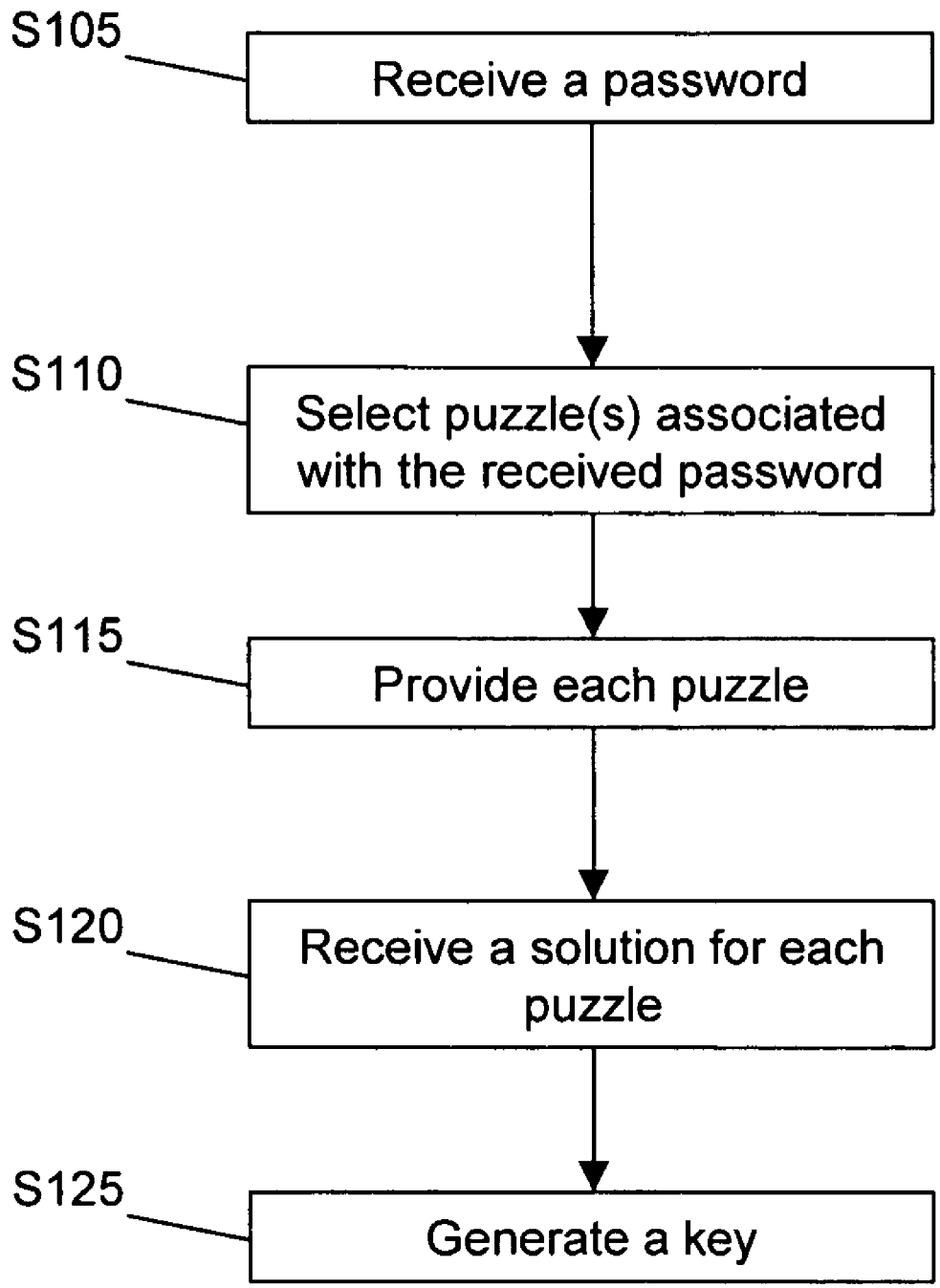
FIG. 1 illustrates a flowchart for key generation according to an exemplary embodiment of the invention.

FIG. 1 illustrates a method for generating a cryptography key using stored puzzles. The system receives a password from the user, S105. The password is used to select the puzzle(s) that will provide the basis for the key, S110. Each puzzle is provided to the user, S115, and a solution is received for each puzzle, S120, with these steps being repeated for each puzzle with a solution set being created. The more puzzles used in deriving the key will increase the entropy of the key and in turn the burden on a potential hacker. A key is generated based on the solution(s) to the puzzle(s) entered by the user, and in at least one exemplary embodiment the password is included in the creation of the key, S125.

An exemplary way to select the puzzle(s), S110, is using an Expand function that maps the password and potentially other information into a list of indices matched to the set of puzzles, where the number of indices that are derived is a parameter of the system and represents the number of puzzles that will need solutions from the user. In this discussion, the exemplary number of puzzles is eight. An exemplary way to accomplish this is to derive eight indices from the password using, for example, the function SHA1, although other functions could be utilized. Namely, one exemplary embodiment stores a short random salt on the disk, for example, a 12-byte salt (or other type of random data) and computes s=SHA1 (salt|password), where s is a 20-byte string, which can be parsed as eight 20-bit integers s=(i1, i2, i3, i4, i5, i6, i7, i8)

and view each of these $i_j$'s as an index into a set of $2^{20}$=1048576 puzzles that are stored on the disk. The number of puzzles will impact the length of the index integers.

Providing a puzzle, S110, includes, for example, displaying the puzzle on a monitor or other display for the user to view, but also includes playing audio for the user as the source of the puzzle or in addition to a visual cue. This step can also include other methods of communicating with the user as appropriate for particular applications. Receiving a solution, S115, may include receiving an input via keyboard, mouse, or touch screen of a response from the user, or recording of the user's audio response or any other input method from the user to the computer system.

An exemplary way to create the key, S125, is to derive the key from the solution(s) provided by the user using an Extract function, and as illustrated below eight puzzle solutions. In at least one exemplary embodiment the cryptographic key is extracted based also on the user's password and potentially other information. An example of this is using HMAC-SHA256 (keyed-hash message authentication code-secure hash algorithm 256)(or another function) with another short random salt as the HMAC (keyed-hash message authentication code) key, namely setting key=HMAC-SHA256(salt; solution1|solution2| . . . |solution8|password)

The 32-byte cryptographic key is the output of the method. This key can then be used by an application program to protect the local storage, for example, with encryption. The generated key also is useable to gain access to data previously encrypted using that key. The generated key also is useable in at least one exemplary embodiment to authenticate the data it is attached to and provide a latter user of the data information as to whether the data has been altered since authenticated. The generated key also is useable in at least one exemplary embodiment to verify the authentication associated with the data previously authenticated with the key.

The method illustrated in FIG. 1 is also used for key-recovery, because the puzzles are selected based on the received password. In a variation of this method in step S125, small inconsistencies in the solutions that are provided by the user can be addresses by using fuzzy extractors, as described by Y. Dodis, L. Reyzin, and A. Smith in "Fuzzy Extractors: How to Generate Strong Keys from Biometrics and Other Noisy Data", EUROCRYPT 2004, which is hereby incorporated by reference. Fuzzy extractors will allow for small inconsistencies in the solution set that occur over time to produce the same encryption key. Fuzzy extractors store a hash of the solution together with the puzzle such that the hash does not provide too much information about the solution, but the hash has enough information to correct a solution that is close to a perfect solution.

An exemplary method using the above-described methods generates the key based also on the login identification for the user in addition to the password and the puzzle solution(s) entered by the user. This provides yet another layer of protection and information that a hacker would need to have and/or guess before gaining access to the key.

In at least one exemplary embodiment, the function for deriving the puzzles from the password corresponds to a expander graph as described, for example, by R. Motwani and P. Raghavan in chapter 5 of "Randomized Algorithms", Cambridge University Press, New York (N.Y.), 1995. The vertices of the graph are the passwords and puzzles that are used in the system, and each password is connected to all the puzzles that are derived from it. This graph is an expander graph if for every small enough set of passwords, the number of puzzles that are connected to them is considerably larger than the number of passwords in that set.

The function for deriving the key from the answers and the password needs to be a randomness extractor as discussed by N. Nisan and D. Zuckerman in "Randomness is Linear in Space," *J. Comput Syst Sci.* 52(1): 43-52 (1996). A randomness extractor is a function with the property that if its input is sufficiently random than the output is almost completely random. For example, if half of the bits of the input are random and the other half are fixed to some arbitrary values, the output will be random (i.e., each bit is ½ zero and ½ one, and the different bits are independent).

The puzzles that are usable in the current invention must be solvable by humans but hard to solve by computers, which means that artificial intelligence is not likely to be able to solve the puzzle. The concept for the puzzles is more general than reverse-Turning-tests or CAPTCHAs (Completely Automated Public Turing Test to Tell Computers and Humans Apart), in that the current invention does not rely on the feature that the puzzles can be efficiently generated together with their answers. Moreover, the puzzles do not need to have one right answer that all humans agree on; instead, all that is required is that the same person will be able to solve the puzzles in a consistent manner. As such, the puzzles can include objects similar to inkblots (or other pattern resembling an inkblot that might be used in the Rorschach test from the psychology field) where different people give different answers to the same puzzle. The inkblot could be generated based on the hash value associated with the password and/or user identification with the hash value providing seed data for creating the inkblot as a person of ordinary skill in the art would recognize. Additional examples of puzzles that will work include personal rankings, personal clustering, imaginative inferring, personal association, and personal distinguishing.

Examples of personal ranking puzzles include pictures of different persons, to be ranked, for example, by coolness, age, or taste in clothing. Alternatively, puzzles may include different pictures or descriptions of food, to be ranked, for example, by tastiness, spiciness, or cost. Or, a puzzle may depict several randomly generated or selected drawings to be ranked by personal liking. Alternatively, an audio puzzle may sound several short melodies to be ranked by liking. In at least one exemplary embodiment, the melodies, like the inkblots, are generated based on the hash value associated with the received password and/or user identification.

Examples of personal clustering puzzles include a bunch of various unrelated objects, and the question is which three objects "go together" the best, or are the most "closely related" or "look alike". The objects can be people, household items, cartoons, or a mix of all categories.

Examples of imaginative inferring puzzles include portrayal of a scene and asking questions about what happened a minute ago, or what will happen in a minute. Alternatively, questions can be asked regarding what is happening outside the borders of the picture.

An example of personal association puzzles include depicting an object (e.g., a person) and ask which familiar objects (or persons) do the object in the picture reminds the user of.

Examples of distinguishing puzzles include showing a series of pictures that includes family (and/or friends) pictures provided by the user mixed in with pictures of non-family members similar to a line-up. These puzzles when used could display different pictures as long as the family/friends pictures were family/friends pictures and non-family/friends pictures were non-family/friends pictures.

Other exemplary puzzles could be based on tactile and/or scent created for the user. A tactile puzzle could be produced by a Braille output device that is similar to the puzzles described above or a touchblot akin to a sensory inkblot. In at least one exemplary embodiment, the touchblot like the inkblot is based on the hash value associated with the received password and/or user identification. The scent puzzle could be created by a device connected to the computer that is capable of mixing chemicals to produce a smell for the user to compare in a ranking puzzle. In at least one exemplary embodiment, the smells, like the inkblots, are based at least in part on the hash value associated with the received password and/or user identification.

The invention in at least one exemplary embodiment receives information and other data that is used in generating puzzles for a particular user or group of users. The puzzles could be generated prior to or in conjunction with puzzles being selected, S110, in the method illustrated in FIG. 1 or the generation of puzzles could occur in place of selecting puzzles, S110. For example, the user could load a series of photographs or pictures that are then used to generate at least one visual puzzle that might involve selecting individuals or items the user recognizes or a ranking puzzle.

The invention in at least one exemplary embodiment includes puzzle-generation of a large number of puzzles that are stored in a local storage such as a hard drive. The puzzles are stored in at least one exemplary embodiment without their solutions. The number of puzzles that are stored is a parameter of the system and based upon the level of security desired. In some systems, it may be reasonable to generate and store approximately one million puzzles, other systems can use as little as a thousand or as many as a few billion. In at least one exemplary embodiment, the number of puzzles in the puzzle database is at least 1000 times the number of puzzles that will be selected for a particular password. With current storage techniques, one million puzzles fit onto a DVD. The properties for the puzzles include: automatic generation of random puzzles and the puzzles will produce consistent answers for a particular human over time.

Figure 2:
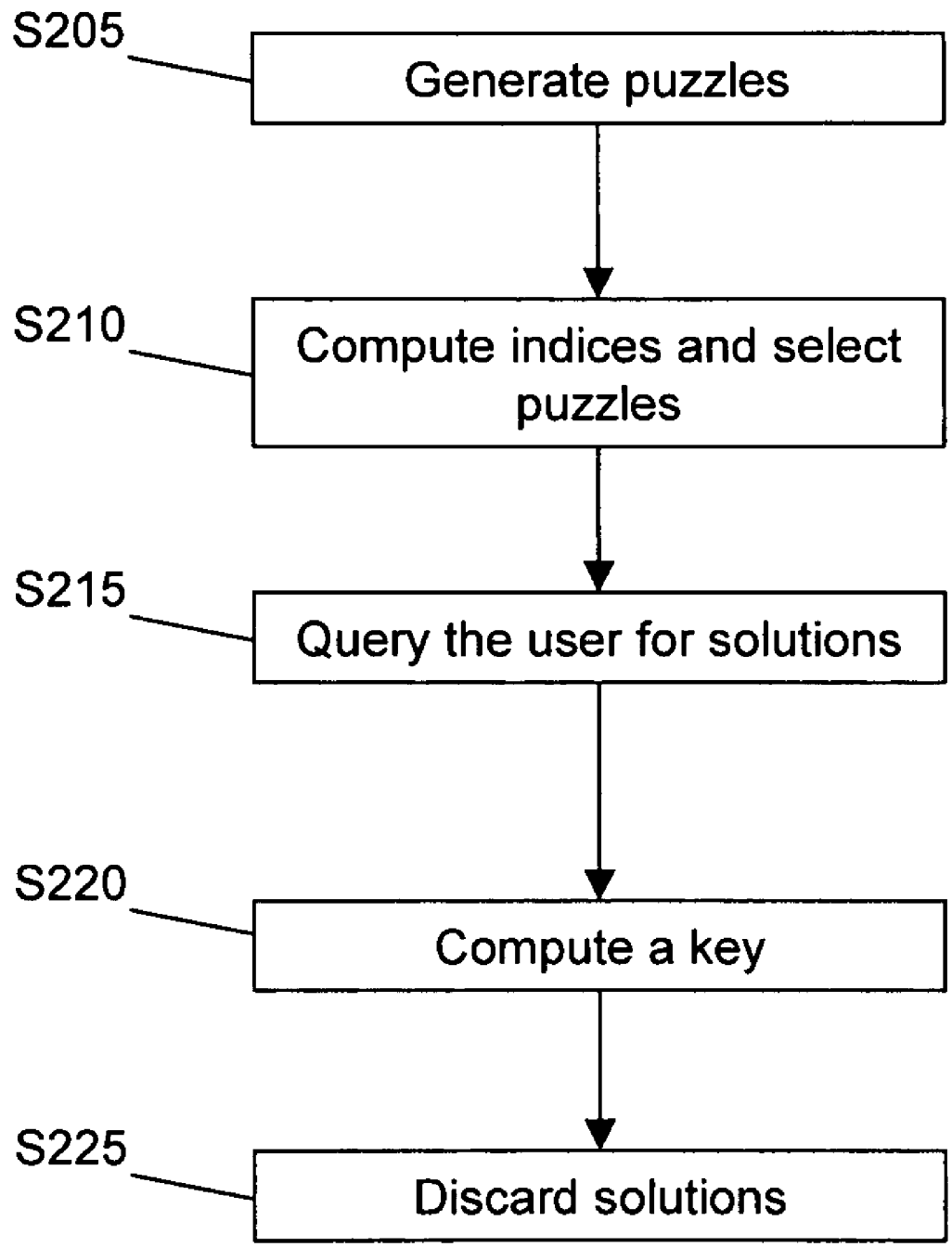
FIG. 2 illustrates a flowchart for key generation according to an exemplary embodiment of the invention.
Figure 3:
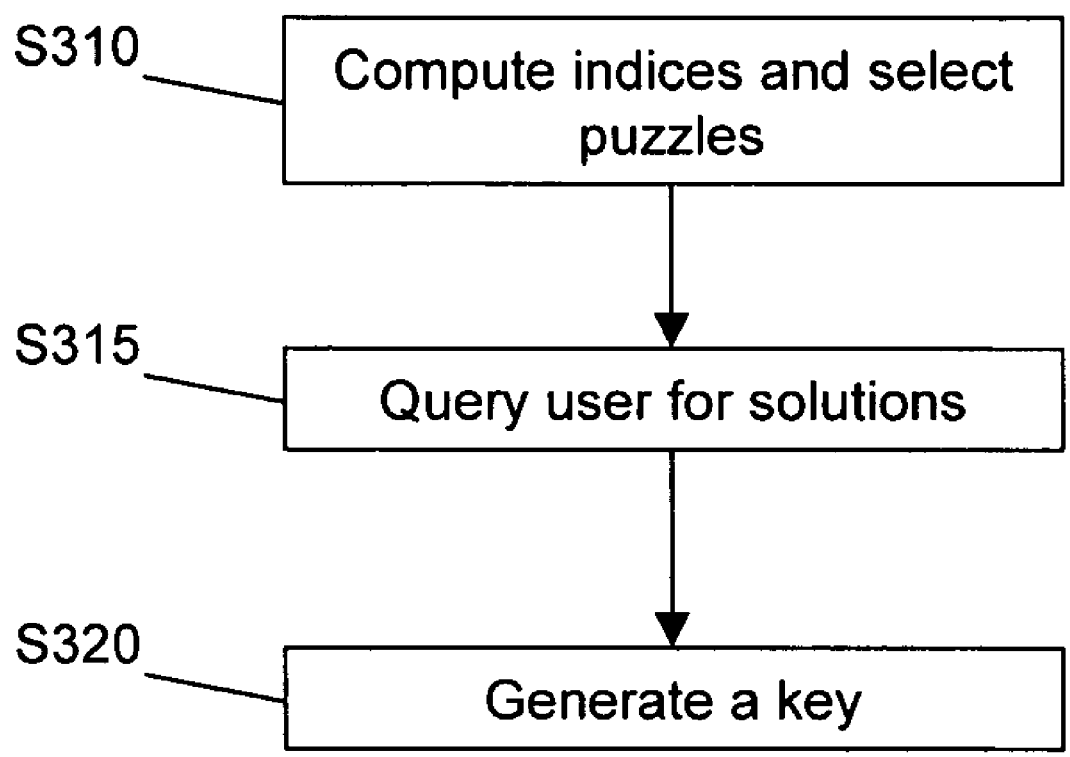
FIG. 3 illustrates a flowchart for key recovery according to an exemplary embodiment of the invention.

FIGS. 2 and 3 illustrate exemplary approaches to key-generation. The method depends on two internal parameters: I, the number of puzzles that the honest user (or human) needs to solve, and n, the number of puzzles that are stored on the disk. In terms of practical parameters, this example will set I=8 and n=1,000,000, both of which values are reasonable. In many systems, reasonable values for the parameter I may range from 2 to over 20 puzzles with more puzzles adding entropy to the encryption key. Other implementations that have been contemplated include setting I=4. The method then uses two (potentially randomized) functions, Expand: $\{0, 1\}^* \rightarrow [n]^I$ and Extract: $\{0, 1\}^* \rightarrow \{0, 1\}^m$.

The role of the Expand function is to map passwords to indices in the vector of puzzles in such a way that the attacker would have to solve many puzzles (i.e., require that a person participate many times) to check each new password guess. For that purpose, the function Expand will be designed to avoid mapping many passwords into a small set of indices.

The role of the Extract function is to extract a pseudorandom key from the unpredictability (or, pseudo-entropy) in the human solutions to the puzzles. More precisely, to better insure that the generated key remains indistinguishable from random as long as the hacker did not explicitly obtain (from a person(s)) solutions to all the I puzzles indexed by Expand (password). Depending on the exact implementation, this goal may be achieved by having the Extract function be a strong randomness extractor such as that discussed by Noam Nisan and David Zuckerman in "Randomness is Linear in Space," *J. Comput. Syst Sci.* 52(1): 43-52 (1996) and discussed above. A strong randomness extractor is a randomness extractor such that its output is not only almost random but also almost independent from the salt that is used by the extractor.

Given these components, the illustrated method works as follows.

As illustrated in FIG. 2, the exemplary key generation method begins with puzzle generation to generate n puzzles, S205. Also, if the Expand and Extract functions are randomized then their keys (such as salts) are chosen at random. The puzzles $<z_1, z_2, \ldots, z_n>$ (and the keys $r_1, r_2$ to the Expand and Extract functions if any) are saved to the disk. This step can be carried out off-line at system setup. The cryptographic key is generated by computing I indices, S210, to select a set of puzzles, e.g., $<i_1, \ldots i_I> \leftarrow \text{Expand}(r_1; \text{pwd})$, which is an example of using an Expand function with the input of a salt and the user entered password to generate in this example I indices to retrieve at least one puzzle for the user to solve. The human user is queried for the solutions to the puzzles that are indexed by $i_1, \ldots i_I$, S215, e.g., thus obtaining l solutions $a_1, \ldots, a_l$. The key is computed, S220, based on the password (pwd) and the solutions entered by the user, e.g., key$\leftarrow \text{Extract}(r_2; a_1, \ldots, a_l)$, which is an example of using an Extract function with the input of a salt and the l solutions to generate a key. After the key is generated, all of the solutions are discarded, S225.

As illustrated in FIG. 3, another way to look at key generation begins with computing the indices (i) based on the password, S310, e.g., $<i_1, \ldots i_I> \leftarrow \text{Expand}(r_1; \text{pwd})$; querying the human user to get the solutions to the puzzles that are indexed by $i_1, \ldots, i_I$, thus getting l solutions $a_1, \ldots a_I$, S315; and recovering the key based on the solutions to the puzzles and the password (pwd), S320, key$\leftarrow \text{Extract}(r_2; a_1, \ldots, a_I, \text{pwd})$, which in this example the Extract function uses the password in addition to a salt and the solutions to generate a key.

Computing the indices, S210 and S310, in the methods illustrated in FIGS. 2 and 3, in at least one exemplary embodiment includes selecting the puzzles from the puzzle database to be used in querying the user, S215 and S315.

If the puzzle system in use is in fact a CAPTCHA system (where puzzles are generated together with their solution) then the key-generation procedure need not query the human user, because the solutions are known and the system is using the puzzles to determine if a response will be received. Alternatively, if the puzzle system is such that puzzles remain hard to solve by a computer even when the corresponding random input of the puzzle-generation routine is known, then the puzzles need not be stored in memory; instead, the value from Expand(pwd) can be used directly as a random input to puzzle-generation.

Based on this disclosure, different implementations of the function that expands the password to indices and the function that extracts the key from the puzzle-solutions and password are possible while still falling within the scope of this invention.

The invention can take the form of an entirely hardware embodiment, an entirely software embodiment or an embodiment containing both hardware and software elements. In at least one exemplary embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium such as carrier signal. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-RAN) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Computer program code for carrying out operations of the present invention may be written in a variety of computer programming languages. The program code may be executed entirely on at least one computing device, as a stand-alone software package, or it may be executed partly on one computing device and partly on a remote computer. In the latter scenario, the remote computer may be connected directly to the one computing device via a LAN or a WAN (for example, Intranet), or the connection may be made indirectly through an external computer (for example, through the Internet, a secure network, a sneaker net, or some combination of these).

It will be understood that each block of the flowchart illustrations and block diagrams and combinations of those blocks can be implemented by computer program instructions and/or means. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowcharts or block diagrams.

The exemplary embodiments described above may be combined in a variety of ways with each other. Furthermore, the steps and number of the various steps illustrated in the figures may be adjusted from that shown.

It should be noted that the present invention may, however, be embodied in many different forms and should not be construed as limited to the exemplary embodiments set forth herein; rather, the exemplary embodiments set forth herein are provided so that the disclosure will be thorough and complete, and will fully convey the scope of the invention to those skilled in the art. The accompanying drawings illustrate exemplary embodiments of the invention.

Although the present invention has been described in terms of particular exemplary embodiments, it is not limited to those embodiments. Alternative embodiments, examples, and modifications which would still be encompassed by the invention may be made by those skilled in the art, particularly in light of the foregoing teachings.

Those skilled in the art will appreciate that various adaptations and modifications of the exemplary and alternative embodiments described above can be configured without departing from the scope and spirit of the invention. Therefore, it is to be understood that, within the scope of the appended claims, the invention may be practiced other than as specifically described herein.

We claim:

1. A method comprising:
   receiving on a computer a password from a user;
   selecting at least one puzzle from a puzzle database based on the received password;
   for each selected puzzle
      providing the puzzle to the user on a computer, and
      receiving a solution for the puzzle from the user on a computer; and
   generating a key on a computer based at least on the entirety of at least one solution, wherein said key is a cryptographic key.

2. The method according to claim 1, further comprising using the key for encryption of data.

3. The method according to claim 2, further comprising using the key to authenticate the data being encrypted.

4. The method according to claim 1, further comprising using the key for decryption of data encrypted with the key.

5. The method according to claim 1, wherein creating a key is based on the entirety of at least one solution and the received password.

6. The method according to claim 1, wherein at least eight puzzles are selected from the puzzle database.

7. The method according to claim 1, wherein selecting at least one puzzle includes expanding the received password into a predetermined number of indices corresponding to particular puzzles within the puzzle database.

8. The method according to claim 1, further comprising:
   receiving information other than the password from the user, and
   wherein selecting at least one puzzle is based on the received password and information provided by the user.

9. The method according to claim 1, wherein at least one of selecting and generating uses a salt.

10. The method according to claim 1, further comprising generating puzzles for the puzzle database.

11. The method according to claim 10, further comprising:
    receiving information other than the password from the user, and
    wherein generating puzzles is based on information received from the user.

12. The method according to claim 1, further comprising generating human-only solvable puzzles for the puzzle database.

13. The method according to claim 1, wherein generating includes using a fuzzy extractor.

14. A method comprising:
    receiving on a computer a password from a user;
    selecting on a computer at least four puzzles indexed with the password from a puzzle database having puzzles solvable by a human and not solvable by a non-human entity;
    for each selected puzzle
       providing the puzzle to the user, and
       receiving on a computer a solution for the puzzle from the user;
    generating on a computer a key based on at least the received solutions; and
    using the key to encrypt files on a computer, wherein retrieving includes expanding the received password into indices to provide the index to puzzles in the puzzle database.

15. The method according to claim 14, wherein retrieving includes expanding the received password into indices to provide the index to puzzles corresponding to particular puzzles within the puzzle database.

16. A computer program product comprising a non-transitory computer useable medium, including a computer readable program, wherein the computer readable program when executed on a computer causes the computer to:
    generate a key including
       receive a password from a user,
       compute indices based on the received password,
       select at least one puzzle from a puzzle database based on the computed indices,
       for each selected puzzle, query the user for a solution,
       compute a cryptographic key based on the received at least one solution and the received password, and
       discard the solutions.

17. A method comprising:
    receiving on a computer information including a password from a user;
    generating one or more puzzles on a computer based on at least some of the received information;
    for each generated puzzle
       providing the puzzle to the user on a computer, and
       receiving on a computer a solution for the puzzle from the user; and
    generating on a computer a cryptographic key based at least on the entirety of at least one solution.

18. The method according to claim 17, wherein generating one or more puzzles uses a salt.

19. The method according to claim 17, further comprising selecting one or more puzzles from at least one of a puzzle database and generated puzzles.

* * * * *